United States Patent
Heym et al.

(10) Patent No.: US 9,868,547 B2
(45) Date of Patent: Jan. 16, 2018

(54) LIGHTING UNIT FOR AN AIRCRAFT INTERIOR

(71) Applicant: Airbus Operations GmbH, Hamburg (DE)

(72) Inventors: Detlef Heym, Hamburg (DE); Günter Schmitz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/381,363

(22) Filed: Dec. 16, 2016

(65) Prior Publication Data
US 2017/0174360 A1 Jun. 22, 2017

(30) Foreign Application Priority Data
Dec. 18, 2015 (DE) .................... 20 2015 106 937 U

(51) Int. Cl.
| | |
|---|---|
| F21V 1/20 | (2006.01) |
| B64D 47/02 | (2006.01) |
| B64D 11/00 | (2006.01) |

(52) U.S. Cl.
CPC ............. *B64D 47/02* (2013.01); *B64D 11/00* (2013.01); *B64D 2011/0038* (2013.01); *B64D 2203/00* (2013.01)

(58) Field of Classification Search
USPC ................................................ 362/471, 470
See application file for complete search history.

(56) References Cited

U.S. PATENT DOCUMENTS

| | | | |
|---|---|---|---|
| 8,393,572 B2 * | 3/2013 | Budinger | B64C 1/18 244/118.5 |
| 9,605,812 B2 * | 3/2017 | Van De Ven | F21K 9/238 |

FOREIGN PATENT DOCUMENTS

| | | |
|---|---|---|
| DE | 10066067 A1 | 10/2002 |
| DE | 102011013368 A1 | 9/2012 |
| DE | 102015000415 A1 | 12/2015 |

OTHER PUBLICATIONS

German Patent Office, German Search Report for German Patent Application No. 202015106937.5 dated Apr. 28, 2016.

* cited by examiner

*Primary Examiner* — Vip Patel
(74) *Attorney, Agent, or Firm* — Lorenz & Kopf, LLP

(57) ABSTRACT

The disclosure relates to a lighting unit for an aircraft interior having a floor with a baseplate fastenable to structure of the aircraft, and having a receiving region that faces away from the structure in a fastened state. An OLED light source having one or more OLEDs is arranged in the receiving region. The lighting unit also has a lens arranged on a side of the OLED light source facing away from the baseplate, and a frame mechanically retained in the receiving region by plug contacts such that the OLED light source and the lens are fastened in the receiving region. The plug contacts include electrical and mechanical contacts, wherein the OLEDs are supplied with electricity by at least one controllable driver, and wherein the contacts supply electricity to the OLED light source.

10 Claims, 2 Drawing Sheets

LIGHTING UNIT FOR AN AIRCRAFT INTERIOR

CROSS-REFERENCE TO RELATED APPLICATION

This application claims priority to German Patent Application No. 202015106937.5, filed Dec. 18, 2015, which is incorporated herein by reference in its entirety.

TECHNICAL FIELD

This relates to a lighting unit for an aircraft interior having a floor. In the present case, the term aircraft comprises all flying vehicles, in particular passenger aircrafts and helicopters.

Known lighting systems, for example cargo hold lighting systems, make use of fluorescent lights. On the one hand, these take up a relatively large amount of room in what is already a confined space. Moreover, they are energy-inefficient, which is disadvantageous in an aircraft with only limited available energy.

Various flat organic light-emitting diode (OLED) lighting systems are already existing, which are also suited for space-saving fastening. For example, the track-like fastening system from the company LG Chem for 200 mm×50 mm OLED panels can be mentioned. Or the flat OLED built-in lighting module, controllable by 24 VDC, from the company Panasonic can also be mentioned, which can be fastened at its installation location by a baseplate.

However, none of these solutions is suitable without modification for use in an aircraft interior with particularly limited space.

The object of the present invention is thus to provide an energy-efficient, space-saving lighting unit for an aircraft interior with an easily replaceable light means.

The device having the claimed features serves to achieve this object. Advantageous embodiments are also contemplated by the claimed subject matter.

The lighting unit for an aircraft interior with a floor according to an embodiment of the invention has a baseplate which can be fastened to the structure of the aircraft and which has a receiving region for an OLED light source, which faces away from the structure of the aircraft in the fastened state. An OLED light source is arranged in the receiving region, wherein the OLED light source can comprise one or more OLEDs. This has the advantage that the risk of total failure of an individual OLED light source is minimized. Three OLEDs have been proved to be advantageous.

The lighting unit moreover has a lens which is arranged on that side of the OLED light source which faces away from the baseplate.

The lighting unit furthermore has a frame which is mechanically retained in the receiving region of the baseplate by plug contacts in such a way that the OLED light source and the lens are arranged fastened positively in the receiving region of the baseplate, wherein the plug contacts comprise electrical and mechanical contacts, and wherein the electrical contacts are configured so that there is a supply of electricity to the OLED light source via them. The electrical contacts can, for example, be spring contacts. The mechanical contact can, in turn, use a clamping mechanism, for example, which can be opened and closed as required in the manner of a quick-release fastener.

The one or more OLEDs are each supplied with electricity according to embodiments of the invention by at least one controllable driver.

The lens functions, on the one hand, as protection for the OLEDs in order to preserve their glass surfaces from mechanical influences. On the other hand, it also serves as shatter protection should an OLED glass surface break. The lens is preferably transparent (clear or colourless). Polycarbonate, for example LEXAN® material or MAKROLON® material, can be considered, for example, for the material.

The lighting unit according to embodiments of the invention is preferably configured such that the baseplate can also be fastened jointly, together with a voltage transformer, to the structure of the aircraft. This allows a space-saving fastening.

The voltage transformer is preferably suitable for converting 115 VAC to a corresponding OLED voltage. In this way, the technical requirements of the OLEDs can be catered for individually.

In a further preferred embodiment of the lighting unit, respective individually controllable drivers allow the supply of electricity to the OLEDs. These drivers can, for example, also be fastened, together with the baseplate and the voltage transformer, to the structure of the aircraft such that an individual space-saving arrangement can be obtained.

According to embodiments of the invention, the OLED light source is preferably suitable for generating illumination of approximately 900 lm. This corresponds to the legal requirements in aircraft.

In particular, FL300 Brite from Phillips is suited as an OLED light source.

The lighting power of the OLED light source on the floor of the aircraft interior is preferably at least 35 lx.

The frame preferably comprises plastic so that it has only a low dead weight.

The material of the baseplate can moreover comprise metal, for example stainless steel. This has the advantage that it can be fastened easily to the structure of an aircraft by conventional fastening techniques (adhesive bonding, bolts) and, in the case of stainless steel, is corrosion-resistant.

In a further embodiment, the OLED lighting unit preferably has two-dimensional dimensions of 372 mm×178 mm, 371 mm×136 mm, 371 mm×161 mm, 410 mm×142 mm, or 470 mm×135 mm. The dimension 371 mm×136 mm allows an identical dimensioning for different aircraft programmes.

In this way, both older aircraft (retrofit) and newer aircraft (line-fit) can be equipped with a lighting system in such a way that the legal requirements of 35 lx are fulfilled. This requirement also exists on the sides and in the corners of the region to be illuminated. Use is made in the arrangement according to embodiments of the invention of the fact that the OLED acts as a Lambertian emitter so that homogeneous lighting is achieved.

In a further particularly preferred embodiment of the present invention, the baseplate is configured integral with a ceiling panel such that the lens is flush with that side of the frame which faces away from the structure of the aircraft. In this way, simple installation with lighting units in an aircraft interior with very limited space is possible.

The ceiling panel preferably comprises sheet moulding compounds (SMC). This material is very light and can be shaped individually so that a design of a recess for the OLED light source which allows a precise fit and saves space is possible. An integral design of a ceiling panel with a lighting unit according to an embodiment of the invention is in particular also possible. Such an arrangement protects the lighting device according to an embodiment of the invention from damage caused by cargo. Pre-installed ceiling panels can in addition be installed very quickly and simply.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
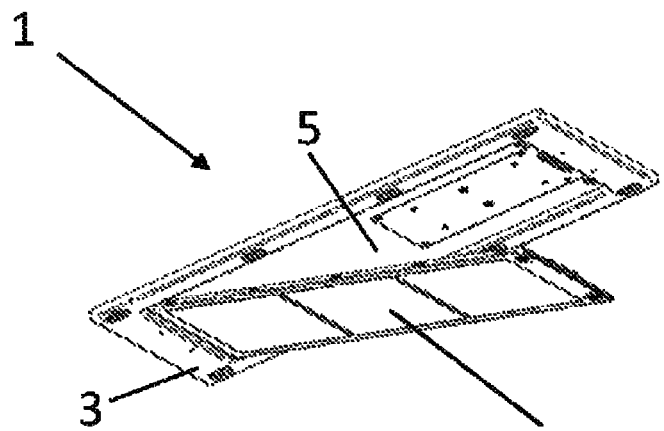
FIG. 1 shows a perspective view of the lighting unit according to an embodiment of the invention.

The lighting unit 1 according to an embodiment of the invention for an aircraft interior can be seen in FIG. 1. It has a baseplate 3 which can be fastened, together or individually with a voltage transformer, to the structure of the aircraft.

The receiving region 5 of the lighting unit 1 which faces away from the structure of the aircraft in the fastened state serves to receive an OLED light source 7. An OLED light source 7 with three OLEDs is shown. The OLED light source 7 is retained in the receiving region 5 of the baseplate 3 by plug contacts.

Figure 2:
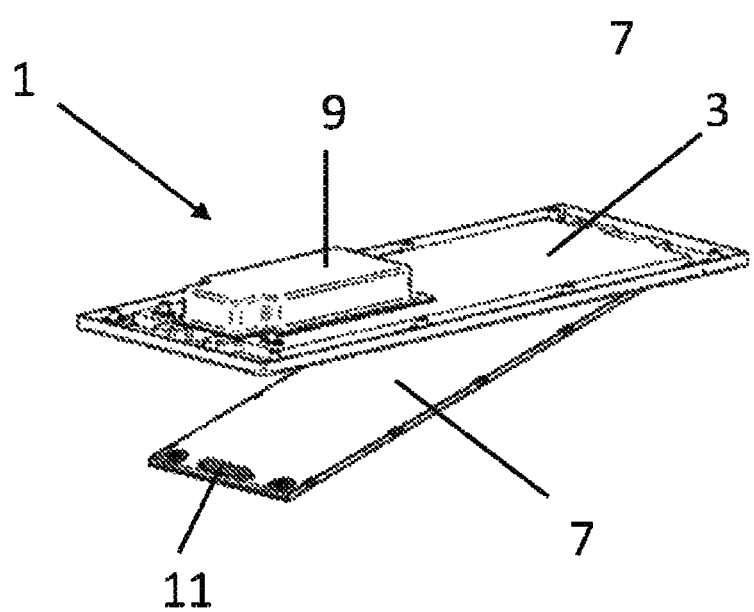
FIG. 2 shows a further perspective view of a lighting unit according to an embodiment of the invention.

The lighting unit 1 according to an embodiment of the invention can be seen in FIG. 2, a voltage transformer 9 being arranged on the rear of the lighting unit 1 and with which the baseplate 3 can also be fastened together to the structure of the aircraft. The electrical plug contacts 11 arranged on the OLED light source 7 can furthermore be seen, which interact with their corresponding electrical plug contacts on the baseplate 3.

Figure 3:
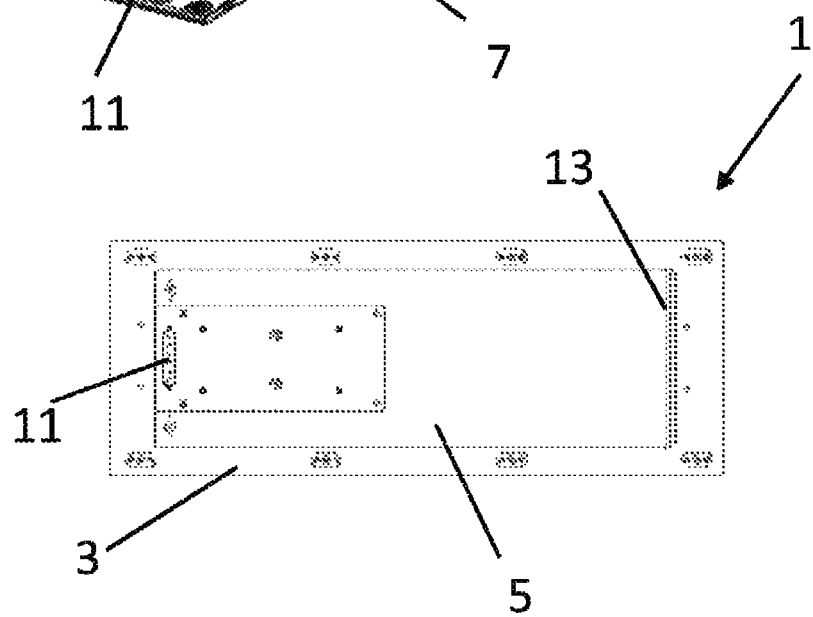
FIG. 3 shows a front view of the baseplate for the lighting unit according to an embodiment of the invention.

FIG. 3 shows a front view of the baseplate 3 for the lighting unit 1 according to an embodiment of the invention, with electrical (plug) contacts 11 for supplying electricity to the OLED light source 7, and mechanical (plug) contacts 13. The electrical contacts 11 can, for example, be spring contacts.

Figure 4:
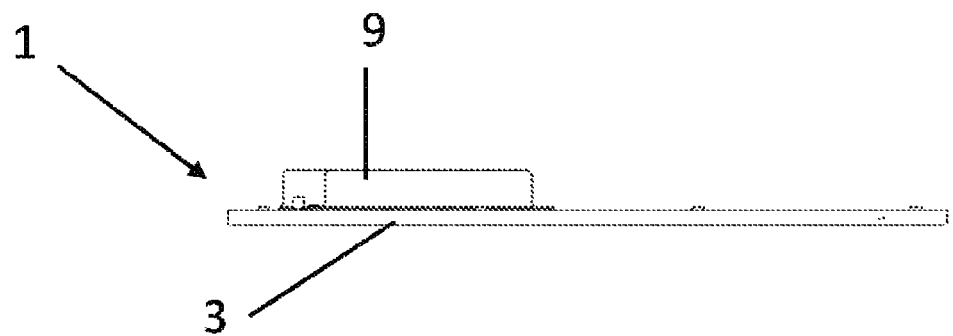
FIG. 4 shows, by way of example, a side view of the baseplate for the lighting unit according to an embodiment of the invention.

FIG. 4 shows the baseplate 3 configured together with the voltage transformer 9.

Figure 5:
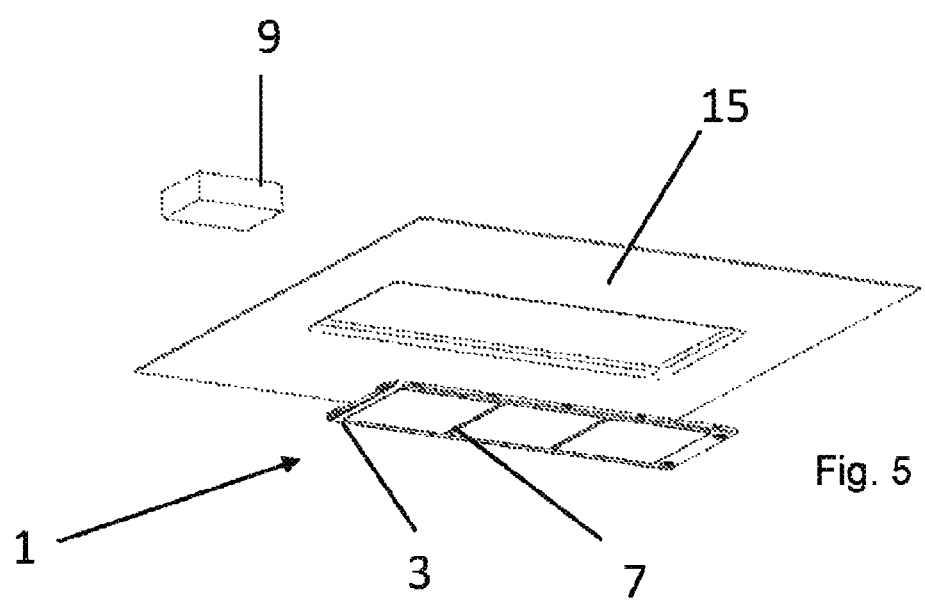
FIG. 5 shows an exploded view of a lighting unit according to an embodiment of the invention and a ceiling panel.

An exploded view of a lighting unit 1 according to an embodiment of the invention is illustrated in FIG. 5 which can be inserted into a ceiling panel 15 of, for example, a cargo hold.

Figure 6:
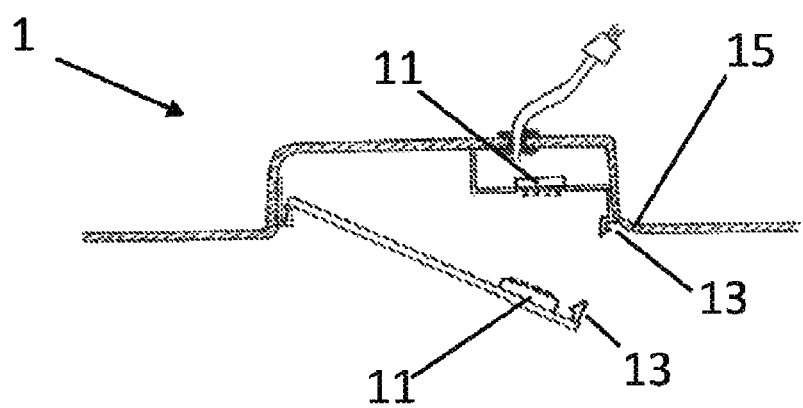
FIG. 6 shows a schematic side view of a lighting unit according to an embodiment of the invention which is configured so that it is integral with a ceiling panel for an aircraft.

FIG. 6 shows a lighting unit 1 according to an embodiment of the invention, wherein the baseplate is configured so that it is integral with a ceiling panel 15 for an aircraft. The combination according to the invention of mechanical and electrical contacts 11, 13 for retaining the lighting unit 1 can also be seen here. The ceiling panel 15 preferably comprises sheet moulding compounds in whole or part. This enables a precisely fitting shaping so that a lighting system that is particularly space-saving is made possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

LIST OF REFERENCE NUMERALS 1 lighting unit
3 baseplate
5 receiving region
7 OLED light source
9 voltage transformer
11 electrical plug contacts
13 mechanical plug contacts
15 ceiling panel

What is claimed is:

1. A lighting unit for an aircraft interior having a floor, comprising:
   a baseplate configured to be fastened to structure of the aircraft, the baseplate having a receiving region, which faces away from the structure of the aircraft in a fastened state;
   an OLED light source arranged in the receiving region, the OLED light source comprising one or more OLEDs;
   a lens arranged on a side of the OLED light source that faces away from the baseplate; and
   a frame mechanically retained in the receiving region of the baseplate by plug contacts such that the OLED light source and the lens are positively fastened in the receiving region of the baseplate, the plug contacts comprising electrical and mechanical contacts;
   wherein the one or more OLEDs are each supplied with electricity by at least one controllable driver; and
   wherein the electrical contacts are configured to supply electricity to the OLED light source.

2. The lighting unit according to claim 1, wherein the baseplate is fastenable to the structure of the aircraft together with a voltage transformer.

3. The lighting unit according to claim 2, wherein the voltage transformer is configured to convert 115 VAC to a corresponding OLED voltage.

4. The lighting unit according to claim 1, wherein respective individually controllable drivers allow the supply of electricity to the OLEDs.

5. The lighting unit according to claim 1, wherein lighting power of the OLED source on the floor of the aircraft interior is at least 35 lx.

6. The lighting unit according to claim 1, wherein the frame comprises plastic.

7. The lighting unit according to claim 1, wherein the baseplate comprises stainless steel.

8. The lighting unit according to claim 1, wherein the lighting unit has two-dimensional dimensions of approximately 371 mm×136 mm, 470 mm×135 mm, or 372 mm×178 mm.

9. The lighting unit according to claim 1, wherein the baseplate is integrally configured with a ceiling panel such that the lens is flush with a side of the frame that faces away from the structure of the aircraft.

10. The lighting unit according to claim 9, wherein the ceiling panel comprises sheet moulding compounds.

* * * * *